(12) United States Patent
Veltri

(10) Patent No.: US 7,293,580 B2
(45) Date of Patent: Nov. 13, 2007

(54) VALVE

(75) Inventor: Jeffrey A. Veltri, Burlington (CA)

(73) Assignee: V-Controls Inc., Taichung (TW)

( * ) Notice: Subject to any disclaimer, the term of this patent is extended or adjusted under 35 U.S.C. 154(b) by 192 days.

(21) Appl. No.: 11/247,926

(22) Filed: Oct. 10, 2005

(65) Prior Publication Data

US 2007/0084513 A1    Apr. 19, 2007

(51) Int. Cl.
*F16K 11/14* (2006.01)

(52) U.S. Cl. .................. 137/596.16; 137/596.15

(58) Field of Classification Search ........... 137/596.15, 137/596.16, 596.17, 596.18
See application file for complete search history.

(56) References Cited

U.S. PATENT DOCUMENTS

| | | | | |
|---|---|---|---|---|
| 2,825,362 A * | 3/1958 | Hicks, Jr. | ............... | 137/596.16 |
| 2,984,257 A * | 5/1961 | McCormick et al. | .. | 137/596.15 |
| 3,385,319 A * | 5/1968 | Myers | ................... | 137/596.18 |
| 4,516,604 A * | 5/1985 | Taplin | ................... | 137/596.15 |
| 4,516,605 A * | 5/1985 | Taplin | ................... | 137/596.15 |
| 4,540,020 A * | 9/1985 | Taplin | ................... | 137/596.15 |
| 4,637,431 A * | 1/1987 | Taplin | ................... | 137/596.15 |
| 4,875,500 A * | 10/1989 | Ariizumi et al. | ........ | 137/596.18 |
| 5,072,748 A * | 12/1991 | Gripe et al. | ........... | 137/596.18 |
| 6,505,645 B1 * | 1/2003 | Pack et al. | ............. | 137/596.18 |
| 6,554,026 B1 * | 4/2003 | Focke et al. | ........... | 137/596.15 |

* cited by examiner

*Primary Examiner*—Gregory Huson
*Assistant Examiner*—Craig Price
(74) *Attorney, Agent, or Firm*—Mark A. Mersereau; Nikolai & Mersereau, P.A.

(57) ABSTRACT

The valve includes a body having five surfaces and a plurality of blind holes, grooves and channels interconnected with the blind holes to form communication net. Two rectangular diaphragms are embedded separately into the grooves so as to selectively open and close the blind holes. An internal sliding base with an external sliding base coupled to the external periphery thereof and comprises a sliding section and an internal press pillar disposed separately on two corresponding ends of the bottom of the sliding section. The two internal press pillars are capable of selectively opening and closing the two diaphragms. The external sliding base includes an external press pillar disposed separately on both corresponding ends of the concave groove. A casing for covering the external periphery of the external sliding base is secured with the body. At least one elastic member is installed between the top surface of the casing and the external sliding base.

6 Claims, 16 Drawing Sheets

VALVE

FIELD OF THE INVENTION

The present invention relates to a valve used for pneumatic and hydraulic equipments, and more particularly to a valve that can be made with a less manufacturing cost and can extend its life of use.

BACKGROUND OF THE INVENTION

Referring to FIG. 10 for a prior art valve, the valve comprises a rectangular body 90, an axle hole 91 penetrating the middle of the body 90, a plurality of valve openings 92 and inlets/outlets 93 disposed on a side of the body 90, and each valve opening 92 and inlet/outlet 93 is interconnected to the axle hole 91, and the axle hole 91 includes a piston 94 therein, and the piston 94 includes a piston rod 95, and each piston rod 95 corresponding to each valve opening 92 includes a plurality of flange sections 96 disposed around each piston rod 95, and each flange section 96 includes an O-ring 97 disposed at the external periphery of the flange section 96, so that a fluid such as a high-pressure gas or a high-pressure liquid can flow through each inlet/outlet 93 and each valve opening 92, and the piston 94 can move reciprocally inside the axle hole 91 of the body 90, so as to control the fluid to enter or exit the valve opening 92 and switch the valve positions for its use.

However, the aforementioned prior art valve still has the following shortcomings in its application:

1. The prior art valve has a short life and a high manufacturing cost. Since the piston rod of the prior art valve moves reciprocally in the axle hole of the body for a long time, each O-ring rubs the internal wall of the axle hole, and the O-ring will be worn out easily. After the valve has been used for some time, there will be a gas leakage and the valve will no longer work properly. Therefore, the prior art valve has a short life, wastes lots of maintenance cost and time, and lowers its efficiency.

2. The prior art valve is difficult to manufacture. Since the internal wall of the axle hole of the body of the prior art valve rubs with the O-ring over a long period of time, therefore the interior of the body must have excellent roundness and smoothness. However, the body is usually slender, and the axle hole cannot be manufactured easily, and thus increasing the level of difficulty and cost of the manufacture.

SUMMARY OF THE INVENTION

It is a primary objective of the present invention to provide a valve that adopts the design having diaphragms and channels to greatly extend the life of the valve, and achieve the effects of providing proper operations, convenient manufacturing and lowering the costs.

The foregoing technical measures taken by the present invention provide the following advantages:

1. The invention extends the life of use and lower the cost of the valve. The valve of the invention uses the interactions of an internal valve seat and an external valve seat to achieve the switching of the valve positions. With the design of various channels, the wearing between components can be reduced greatly to effectively lower the wearing produced by the piston rod moving reciprocally between the axle hole of the body of a prior art valve. Therefore, the invention not only provides proper operations, but also effectively extends the life of use and lowers the maintenance cost.

2. The valve of the invention can be manufactured easily. Unlike the prior art valve, the valve of the invention does not need to have excellent roundness and smoothness. The valve of the invention does not have the trouble of manufacturing an axle hole on a slender body. All components of the invention can be made directly by plastic injection molding and thus the invention can greatly reduce the level of difficulty and cost of the manufacture.

The present utility model will become more obvious from the following description when taken in connection with the accompanying drawings.

BRIEF DESCRIPTION OF THE DRAWINGS

FIG. 1-1 is a perspective view showing the invention is used;

FIG. 2-1 is a perspective view of the invention;

FIG. 2-2 is a perspective and cross sectional view of the diaphragms of the invention;

FIG. 2-3 is a cross sectional view of the fixing plate of the invention;

FIG. 2-4 is a perspective and cross sectional view of the internal sliding base of the invention;

FIG. 2-5 is a perspective and cross sectional view of the external sliding base of the invention;

FIG. 2-6 is a perspective view of the casing of the invention;

FIG. 3 is a cross-sectional side view of the invention;

FIG. 4 is a perspective view of a first surface of a body of the invention;

FIG. 5 is a cross-sectional top view of a body of the invention;

FIG. 6 is a cross-sectional view of a distal end of a body of the invention;

DETAILED DESCRIPTION OF THE PREFERRED EMBODIMENTS

Figure 1:
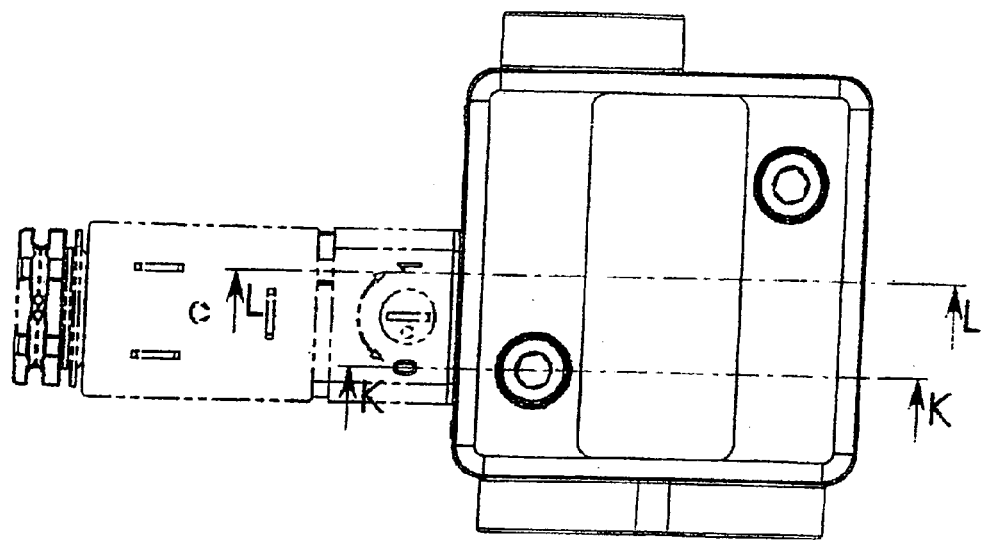
FIG. 1 is a perspective view of the invention.
Figure 1:
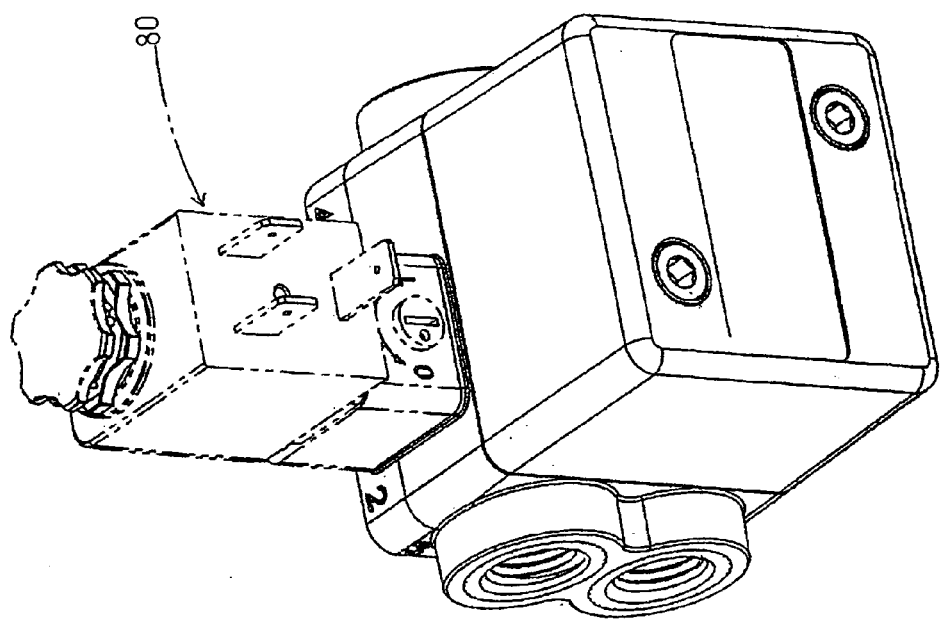
Figure 1:
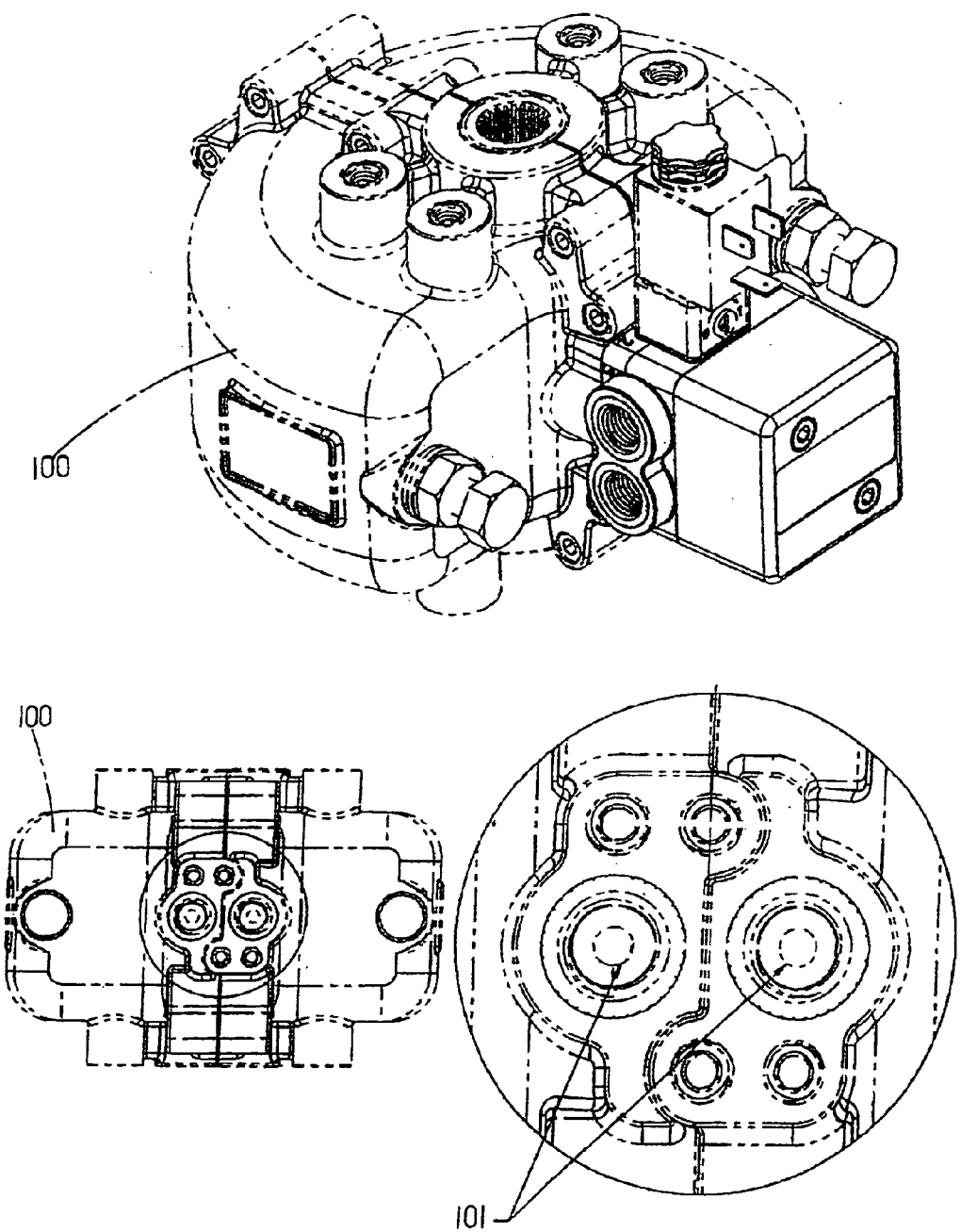
Figure 2:
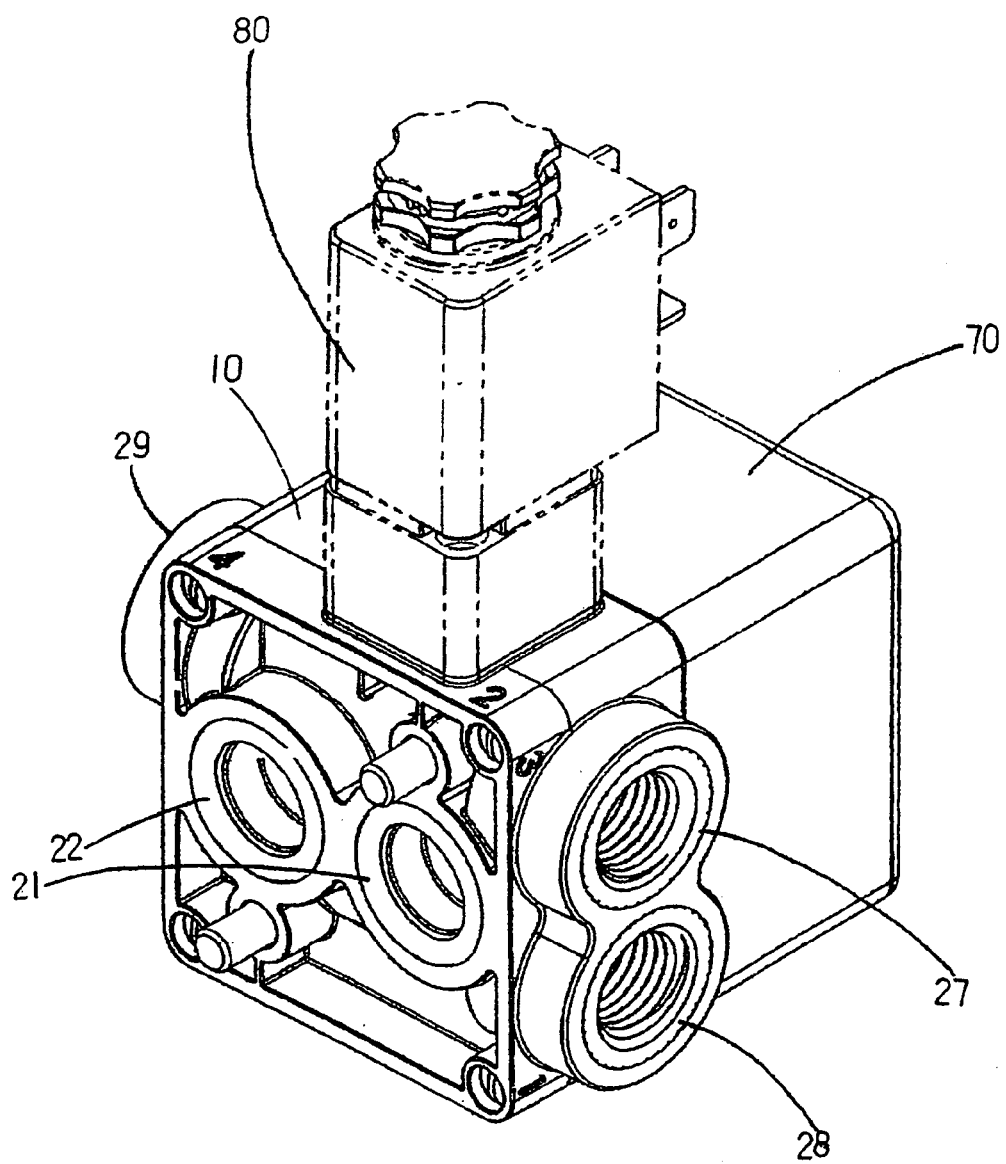
FIG. 2 is an exploded view of the invention.
Figures 1, 2:
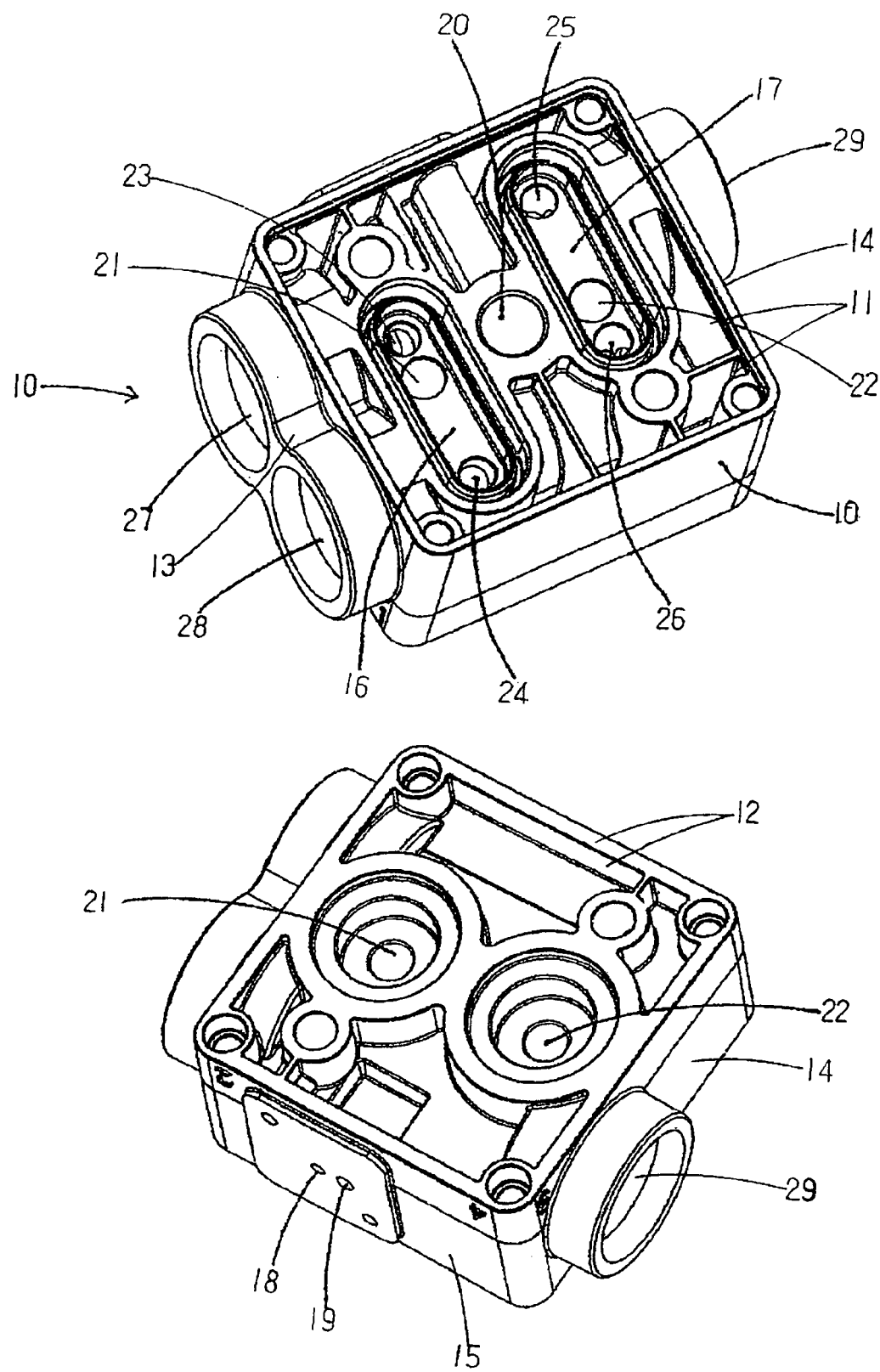
Figure 2:
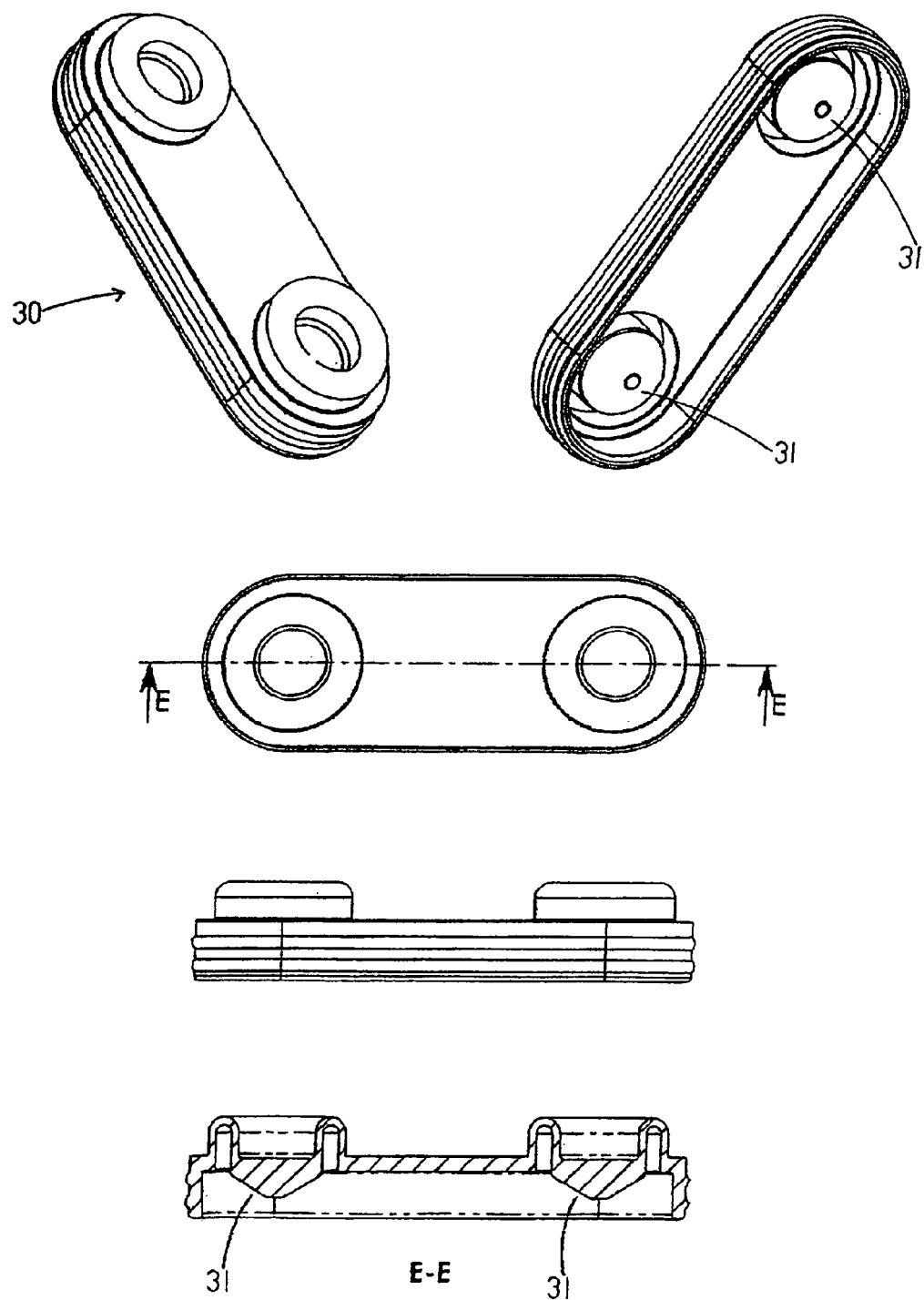
Figures 2, 3:
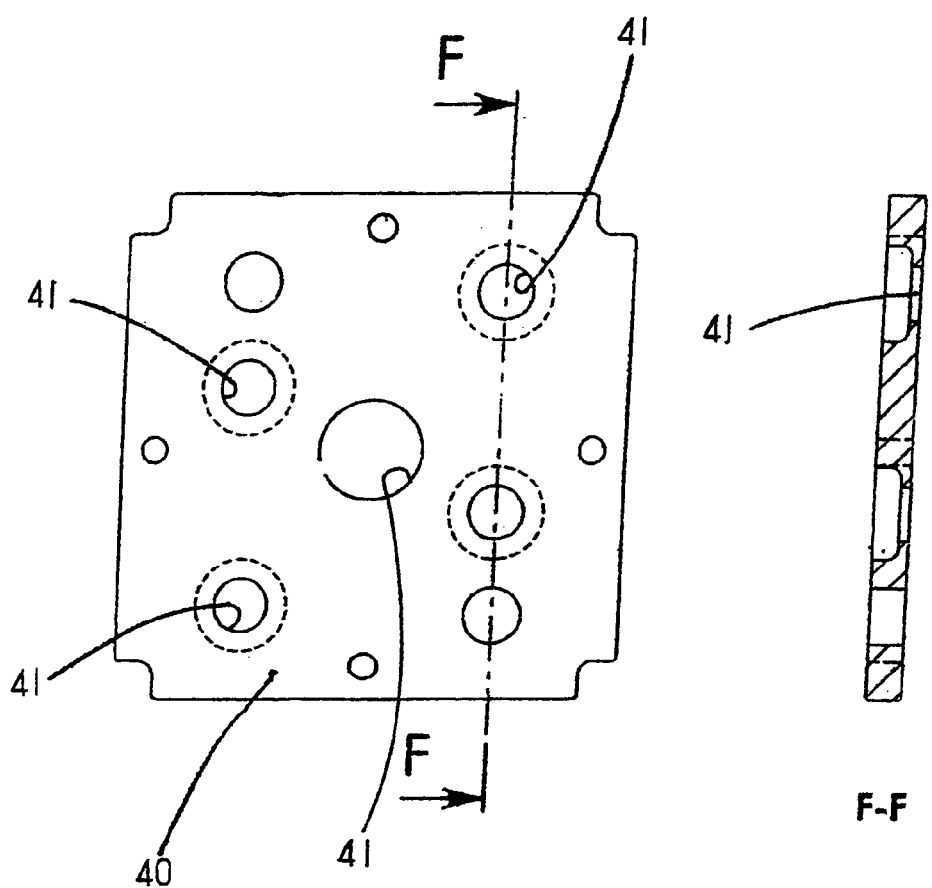

Referring to FIGS. 1 to 3, a valve of the present invention comprises the following elements:

A body 10 as shown in FIGS. 2-1, and 4 to 6 has two main surfaces: a first surface 11 and a second surface 12, and the first surface 11 and the second surface 12 include a third surface 13 and a fourth surface 14 disposed at the peripheries of the corresponding surfaces respectively, and a fifth surface 15 is disposed between the third surface 13 and the fourth surface 14. The body 10 includes a first blind hole 20 disposed at the center of the first surface 11, and a first positioning groove 16 and a second positioning groove 17 in a generally rectangular shape are disposed on both sides of the first blind hole 20. The two positioning grooves 16, 17 are parallel to the third surface 13, and the two positioning grooves 16, 17 include a first penetrating hole 21 and a second penetrating hole 22 disposed on the same horizontal line of the first blind hole 20. A second blind hole 23 and a third blind hole 24 are disposed on both sides of the first positioning groove 16 respectively, and a fourth blind hole 25 and a fifth blind hole 26 are disposed on both sides of the second positioning groove 17, and the second blind hole 23 and the fifth blind hole 26 are disposed on opposite ends, and the distance from the second blind hole 23 and the fifth blind hole 26 to the first blind hole 20 is smaller than the distance from the third blind hole 24 and fourth blind hole 25 to the first blind hole 20, and the third surface 13 includes a first channel 27 interconnected to the second blind hole 23 and a second channel 28 interconnected to the third blind hole 24 and the fifth blind hole 26, and the fourth surface 14 includes a third channel 29 interconnected to the fourth blind hole 25, and the fifth surface 15 includes a fourth channel 18 interconnected to the second channel 28 and a fifth channel 19 interconnected to the first blind hole 20.

Two generally rectangular diaphragms 30 as shown in FIG. 2-2 are embedded separately into the first positioning groove 16 and the second positioning groove 17 of the body 10, and both ends of the two diaphragms 30 include a stop section 31 than can open or shut the second, third, fourth and fifth blind holes 23, 24, 25, 26.

A fixing plate 40 as shown in FIG. 2-3 seals the first surface 11 of the body 10, so that the fixing plate 40 can fix the two diaphragms 30, and a through hole 41 is provided for penetrating the corresponding first, second, third, fourth, and fifth blind holes 20, 23, 24, 25, 26.

Figures 2, 3, 4:
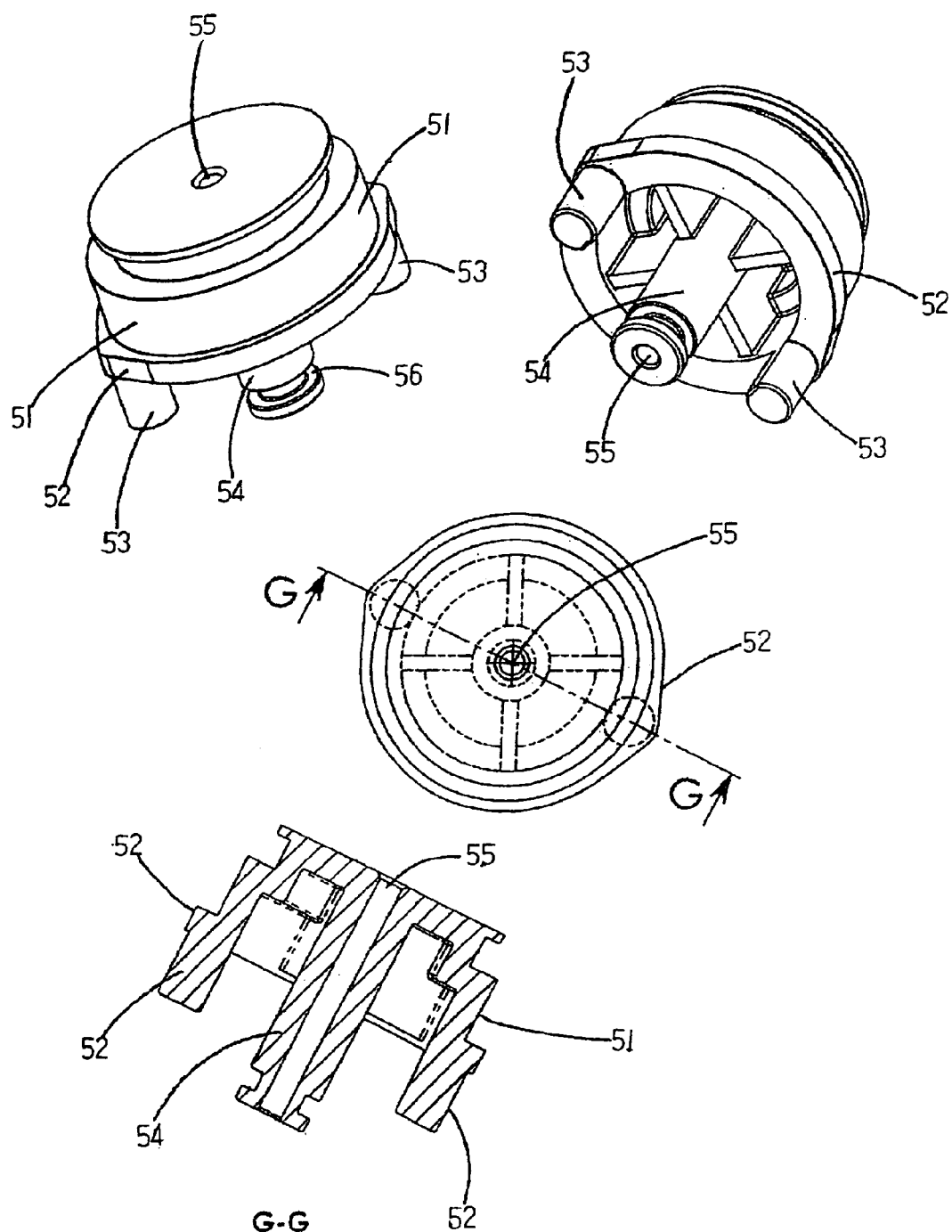

An internal sliding base 50 as shown in FIG. 2-4 is disposed at fixing plate 40 on another side of the body 10, and the internal sliding base 50 includes a sliding section 51, and a shoulder section 52 is protruded from the bottom of the sliding section 51, and an internal press pillar 53 is disposed separately on two opposite ends of the shoulder section 52, and the two internal press pillars 53 pass through their corresponding through holes 41 of the fixing plate 40, and two diaphragms 30 are embedded at the ends corresponding to the positions of the second blind hole 23 and the fifth blind hole 26 of the body 10, and a central axle 54 is protruded from the middle of the internal sliding base 50, and the central axle 54 passes through the through hole 41 of the fixing plate 40 and the first blind hole 20 of the body 10 in sequence, and an O-ring 56 is embedded at an end of the central axle 54, and the internal sliding base 50 includes a through hole 55 passing through the central axle 54.

An external sliding base 60 as shown in FIG. 2-5 is installed at the external periphery of the internal sliding base 50, and the external sliding base 60 includes a concave groove 61 for coupling the internal sliding base 50, and the external sliding base 60 includes an external press pillar 62 disposed at the corresponding end, and the external press pillar 62 corresponds to the through hole 41 of the fixing plate 40, and the ends are embedded into the two diaphragms 30 corresponding to the positions of the third blind hole 24 and the fourth blind hole 25 of the body 10, and the external sliding base 60 includes a containing groove 63 disposed at an end other than the end having the two external press pillar 62.

A casing 70 as shown in FIG. 2-6 covers the external periphery of the external sliding base 60 and is secured with the body 10, and an elastic member 64 is installed between the internal top side of the casing 70 and the two containing grooves 63 of the external sliding base 60, and the foregoing elements constitute the valve of the present invention.

Figures 2, 3, 4, 5:
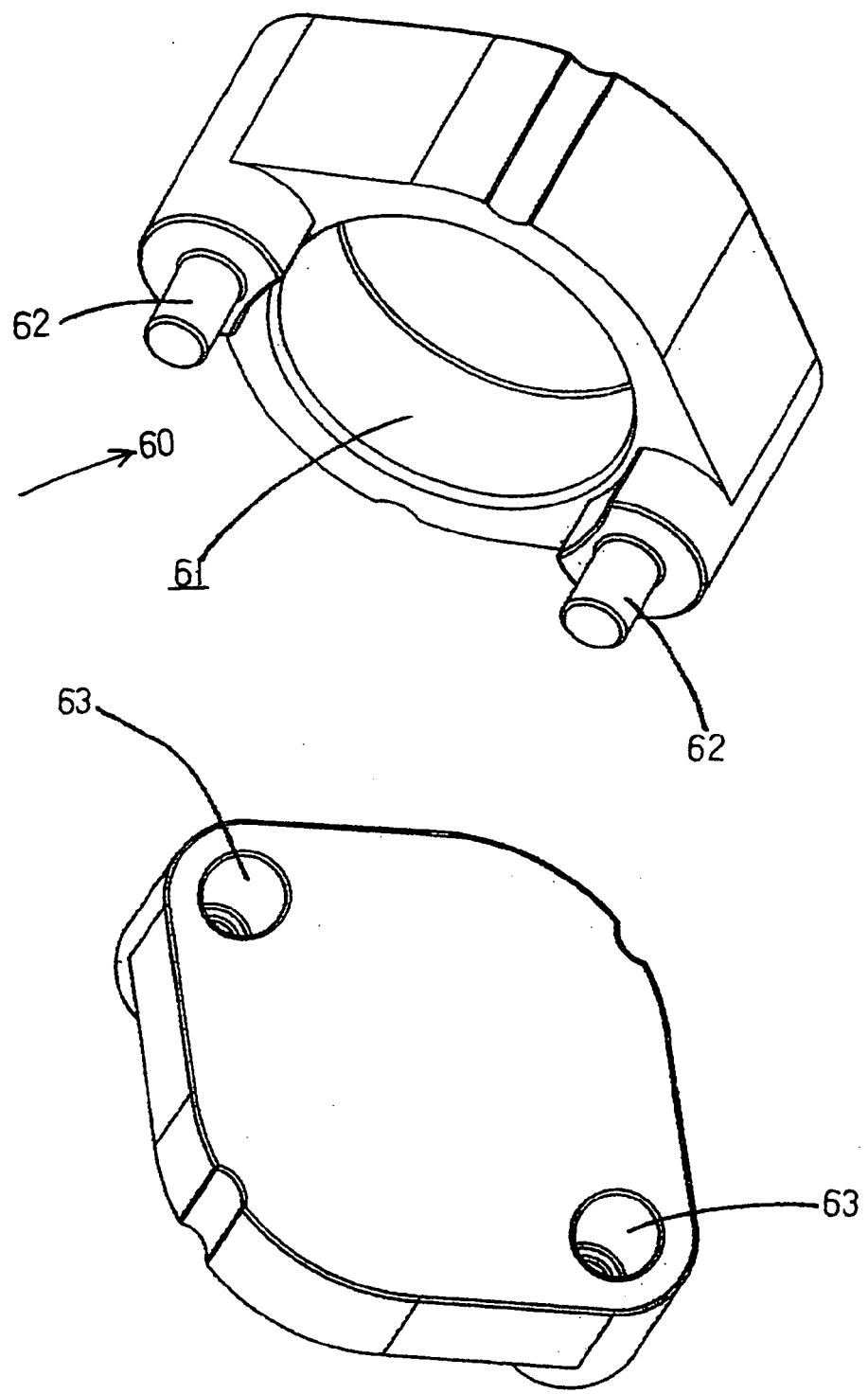
Figures 2, 3, 4, 5, 6:
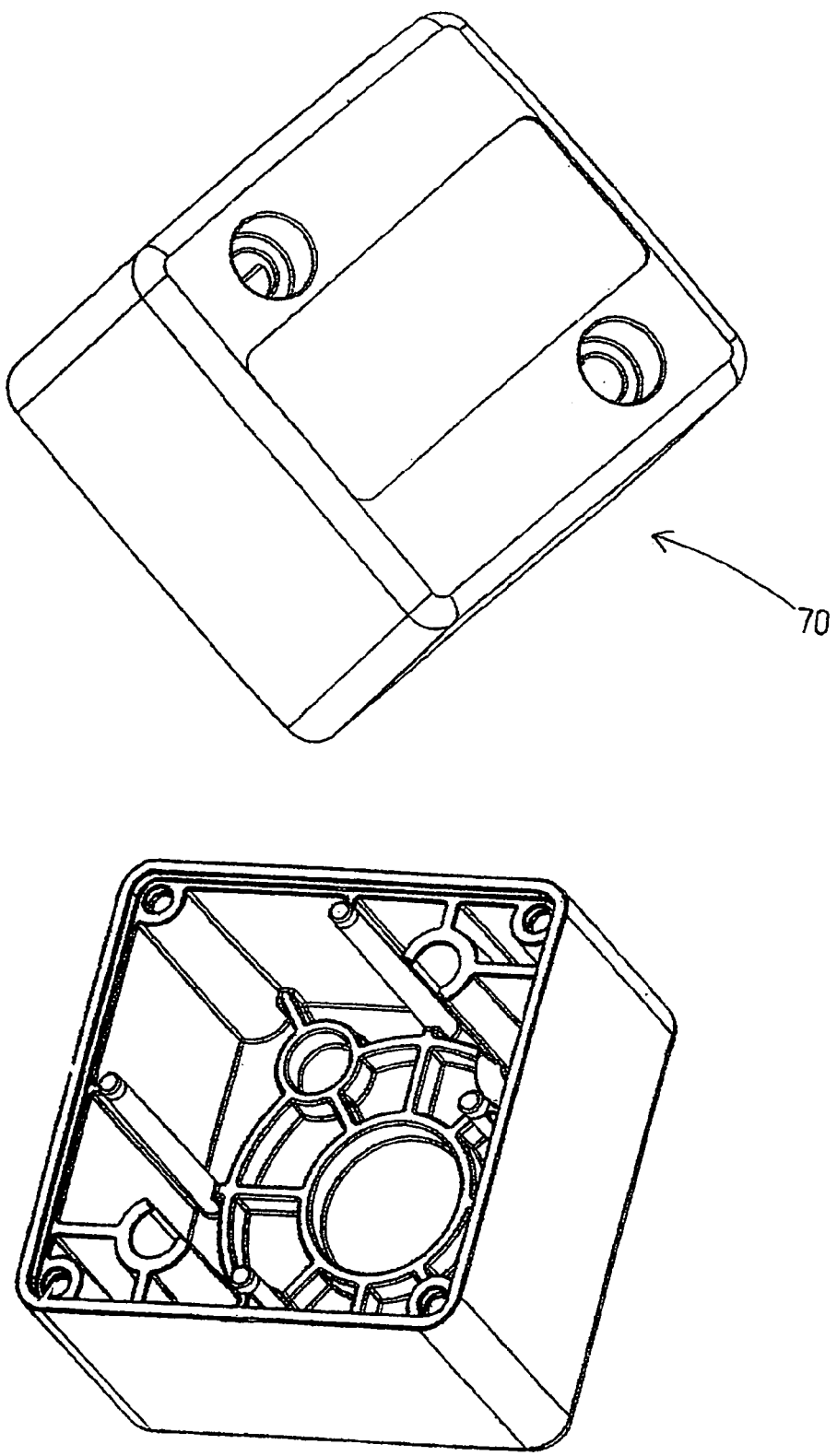
Figure 3:
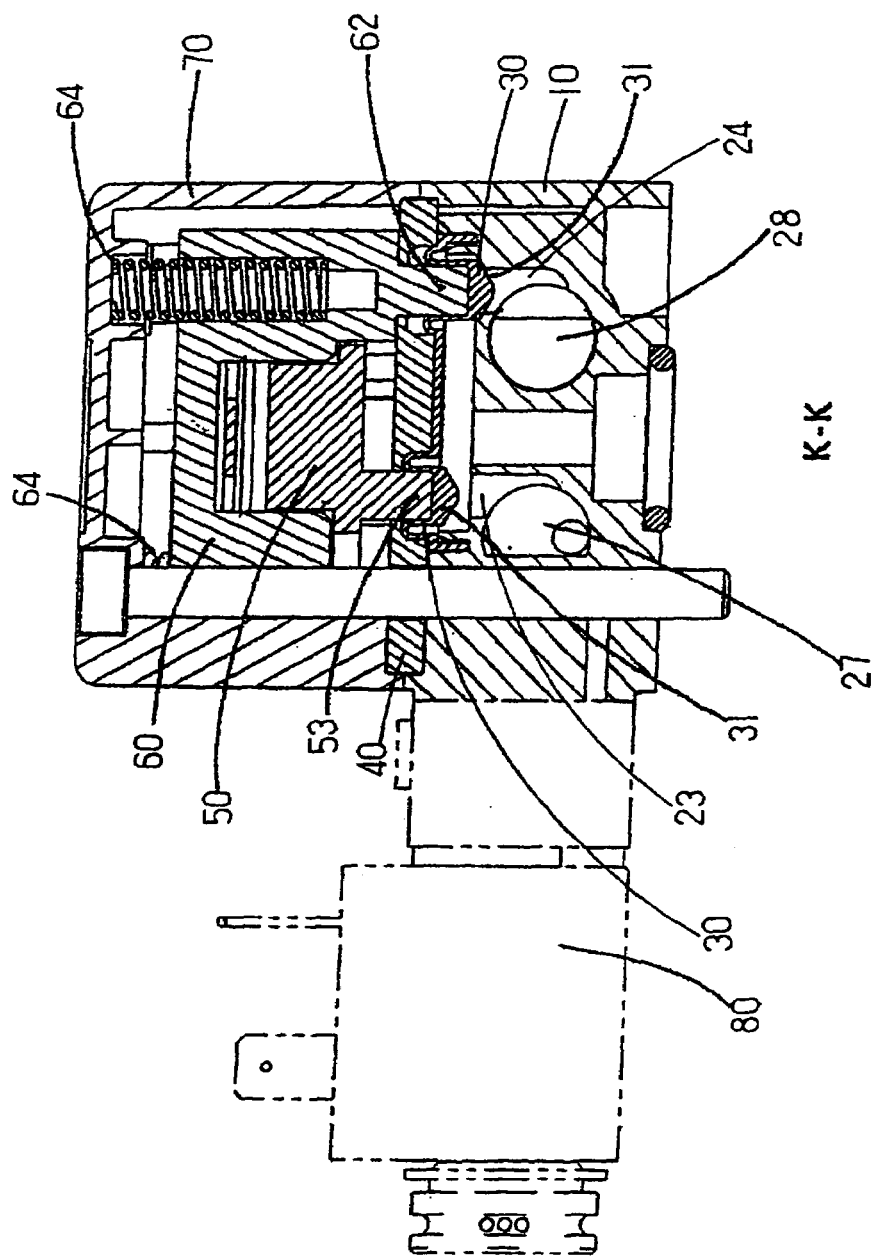
Figure 4:
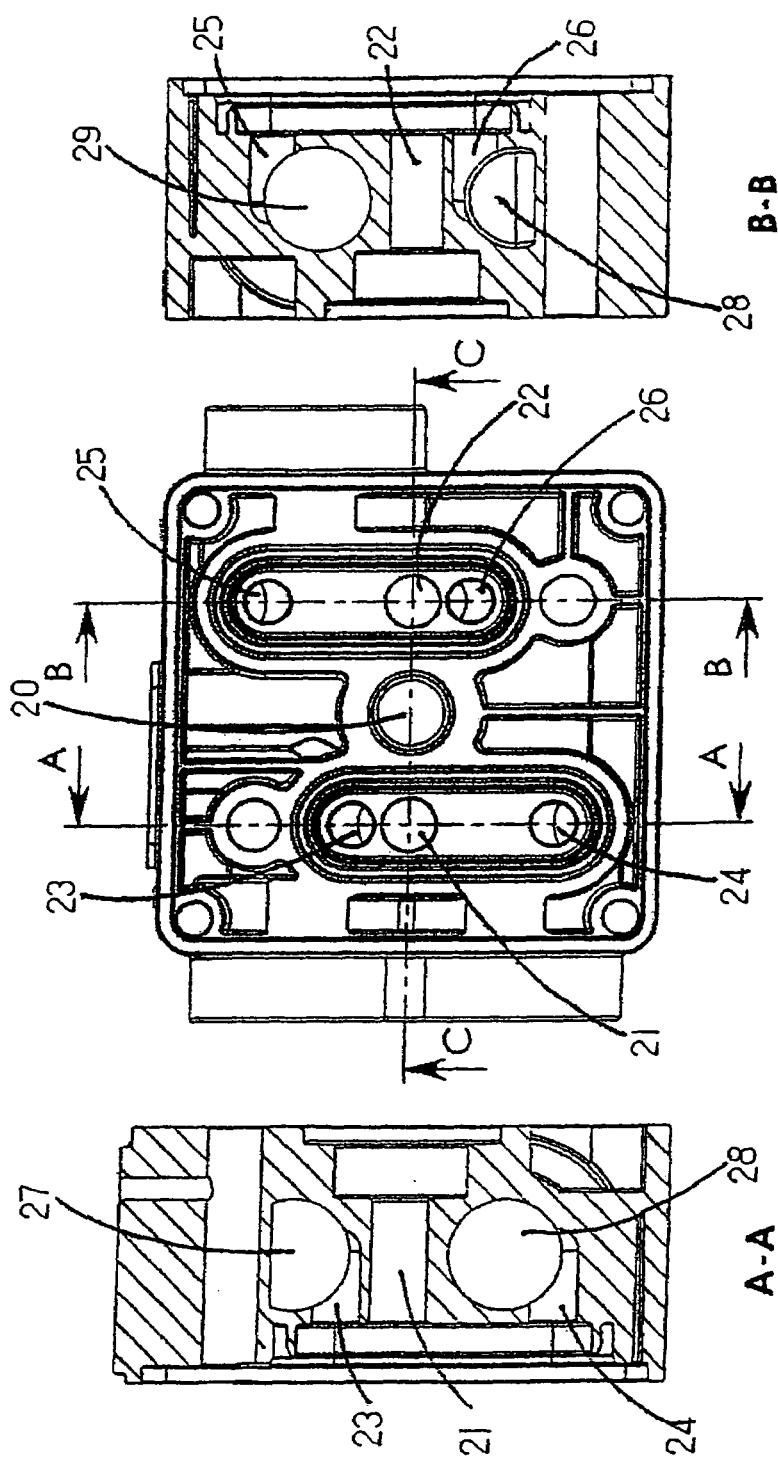
Figure 5:
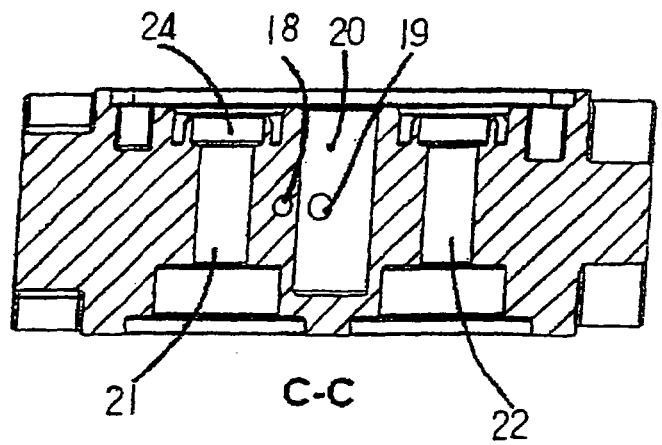
Figure 6:
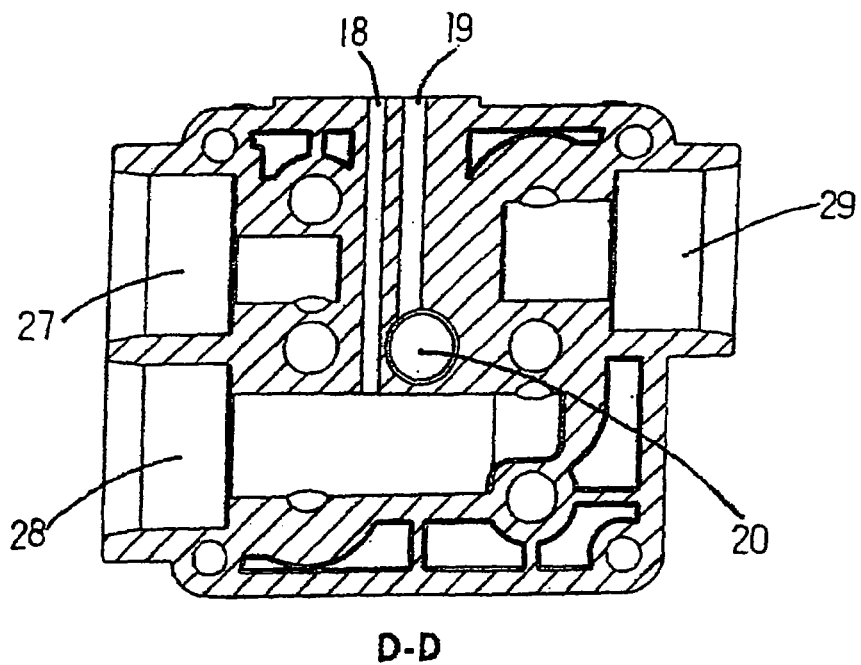
Figure 7:
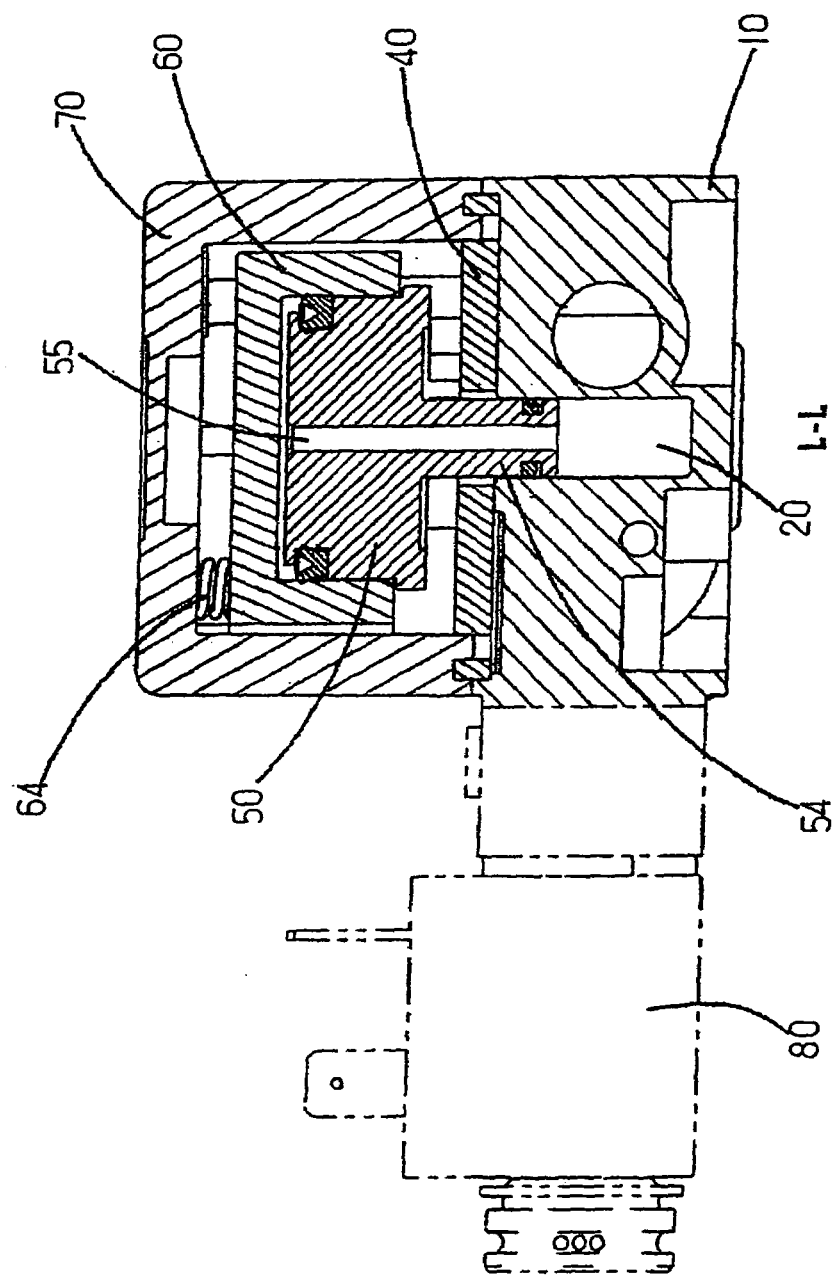
FIG. 7 is another cross-sectional side view of the invention.

When the valve is used as shown in FIG. 1-1, the valve installs a cylinder (not shown in the figure), and the first penetrating hole 21 and the second penetrating hole 22 of the body 10 respectively include two inlets/outlets 101 of the cylinder disposed on an end other than the end having the fixing plate for receiving incoming air from the inlet while discharging air from another outlet, and the fifth surface of the valve includes a solenoid valve 80 capable of turning on or off the fourth channel 18 and the fifth channel 19. For example, the invention is used for pneumatic machines as shown in FIGS. 3 and 7. The first penetrating hole 21 of the body 10 receives air and the second penetrating hole 22 discharges air, and the two elastic members 64 can push the external sliding base 60 in a direction towards the diaphragm 30, so that the two external press pillars 62 of the external sliding base 60 press on the stop section 31 of the two diaphragms 30 for sealing the third blind hole 24 and the fourth blind hole 25 of the body 10, and the second blind hole 23 and fifth blind hole 26 of the body 10 are not pressed to define an open status as shown in FIGS. 4 to 6. Air enters from the first channel 27 and passes through the second blind hole 23 to the interior of the diaphragm 30, and further passes to the first penetrating hole 21, so that the first penetrating hole 21 can pass the high-pressure air to the inlet on a side of the cylinder, and another inlet of the cylinder discharges the air. Therefore, the second penetrating hole 22 of the body 10 is provided for discharging air, and the air is discharged through the second penetrating hole 22 of the body 10 and passed through the corresponding position of the diaphragm 30 and along the fifth blind hole 26 and discharged from the second channel 28, so as to provide the cylinder an end for receiving air and the other end of discharging air.

Figure 8:
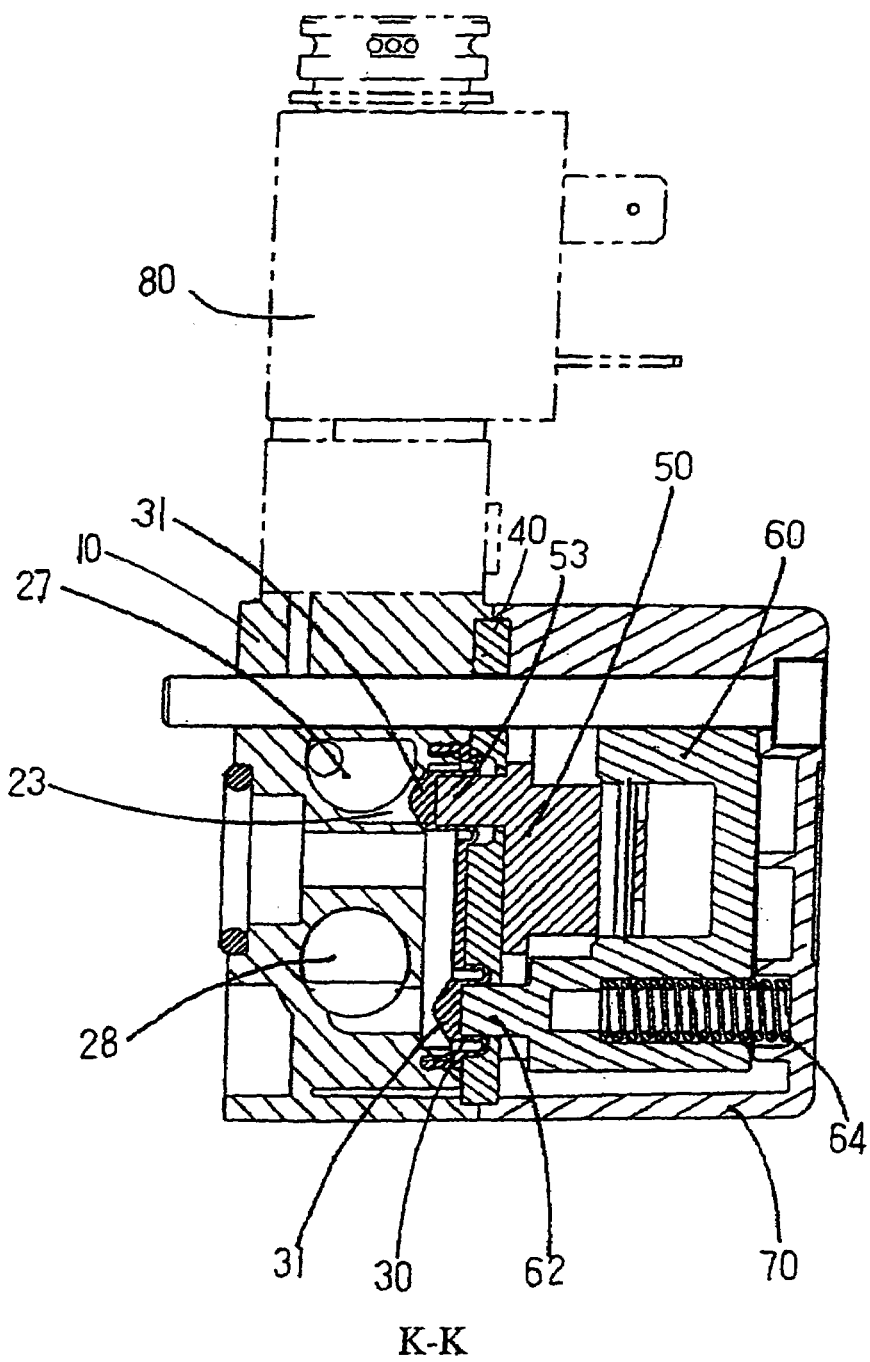
FIG. 8 is a cross-sectional side view of another valve position of the invention.
Figure 9:
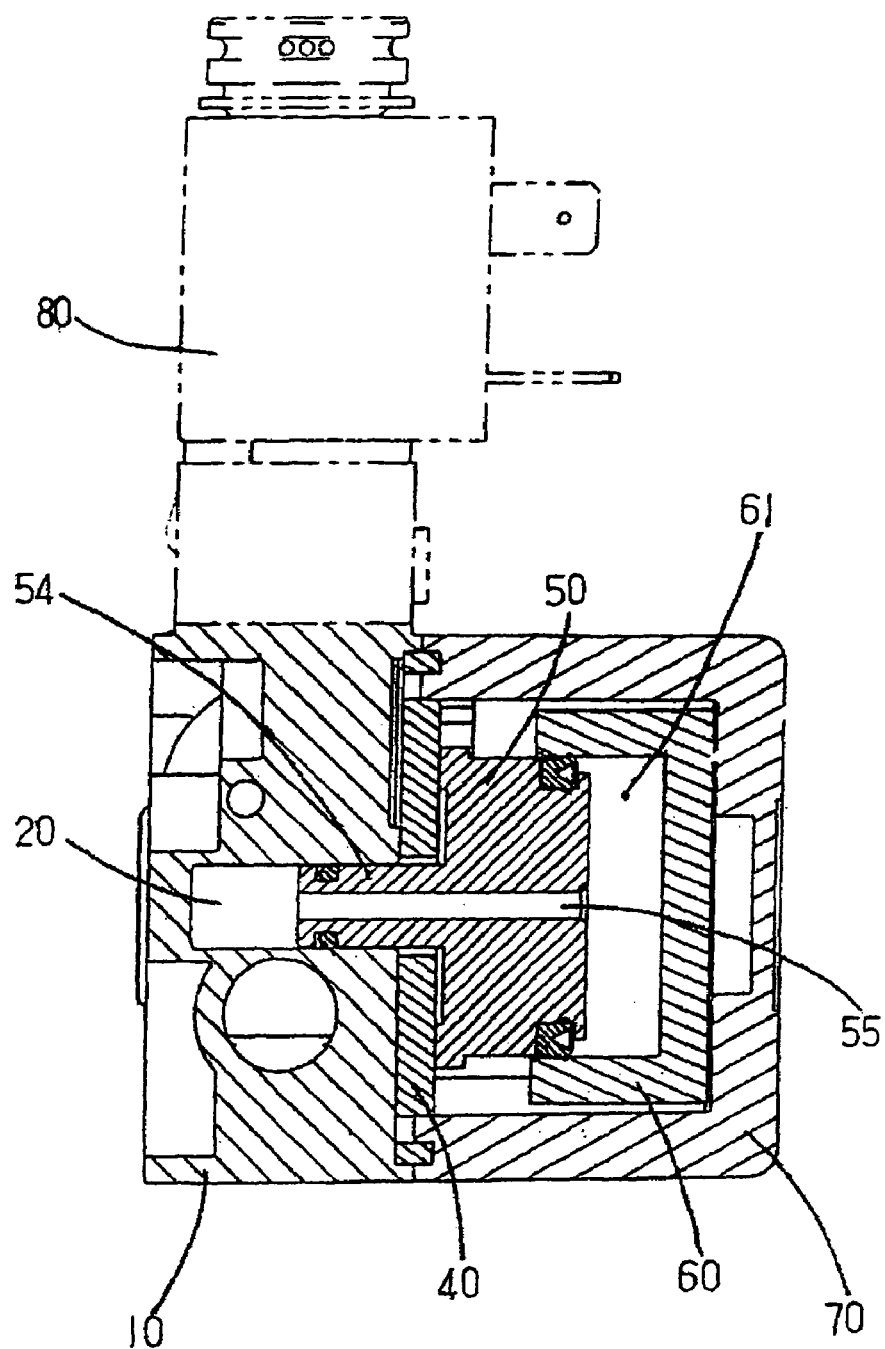
FIG. 9 is another cross-sectional side view of another valve position of the invention.
Figure 10:
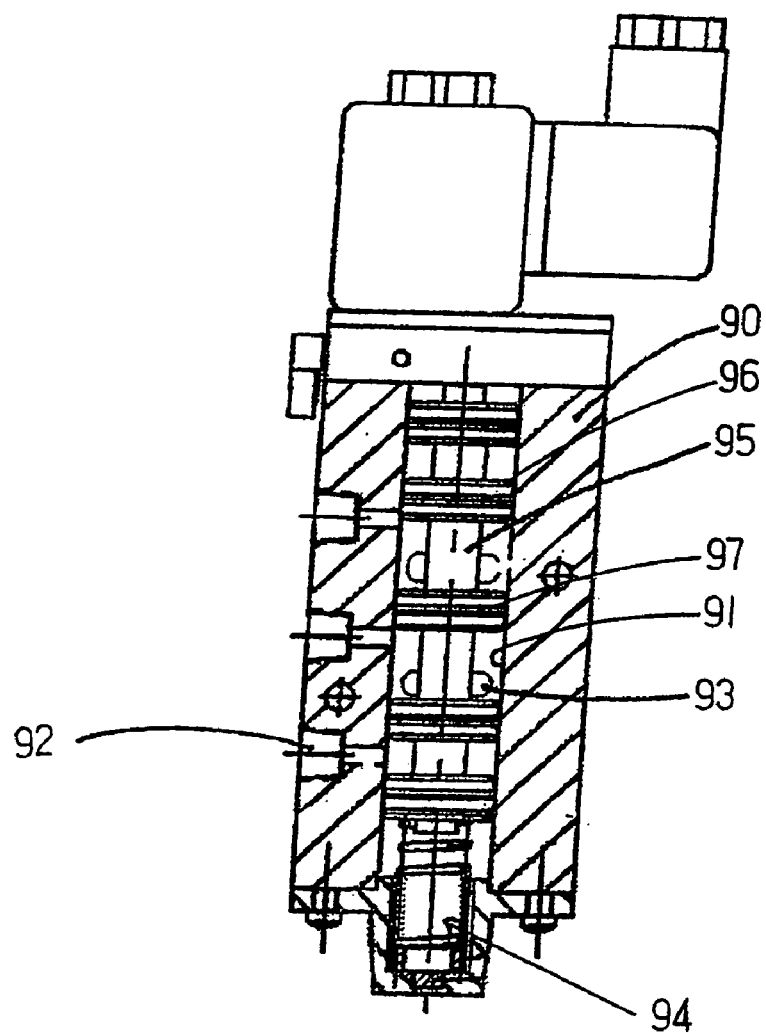
FIG. 10 is a cross-sectional view of a prior art valve assembly.

If it is necessary to switch the directions of receiving and discharging air from the cylinder as shown in FIGS. 6, 8 and 9, the solenoid valve 80 will control the fourth channel 18 and the fifth channel 19 in an interconnected status. Now, the second channel 28 is in an air discharging status, and thus it will pass a portion of the high-pressure air from the fourth channel 18 to the fifth channel 19, so that the air is passed from the fifth channel 19 along the first blind hole 20 to the through hole 55 of the internal sliding base 50. Therefore, the air enters continuously between a concave groove 61 of the external sliding base 60 and the internal sliding base 50. The pressure of the high-pressure air is used to prop open the external sliding base 60 and the internal sliding base 50, so that the external sliding base 60 is moved outward to compress the two elastic members 64 for keeping the third blind hole 24 and fourth blind hole 25 of the body 10 in an open status. The internal sliding base 50 moves towards the fixing plate 40 to press against the two diaphragms 30, so that the stop section 31 corresponding to the diaphragm 30 seals the second blind hole 23 and fifth blind hole 26 of the body 10 to complete the process of switching the directions of receiving air from the first penetrating hole 21 and the second penetrating hole 22.

After the valve positions are switched as shown in FIGS. 4 to 6, the third blind hole 24 and fourth blind hole 25 of the body 10 are in the open status, and the second blind hole 23 and fifth blind hole 26 of the body 10 are in the closed status. If the first penetrating hole of the body 10 is used for discharging air and the second penetrating hole is used for receiving air, then air will enter into the third channel 29 and pass through the diaphragm 30 to the second penetrating hole 22, so that the second penetrating hole 22 is in the status of receiving air, and the first penetrating hole 21 connected to the inlet of the cylinder is in the status of discharging air. Therefore, air will flow from the first penetrating hole 21 along the corresponding position of the diaphragm 30 to the third blind hole 24 and will further pass through the second channel 28 to complete the whole course of receiving and discharging air.

Further, the valve of the invention is applied to the cylinder according to another preferred embodiment. When the second penetrating hole 22 of the body 10 is in the status of receiving air and the first penetrating hole 21 is in the status of discharging air, the two elastic members 64 can prop the external sliding base 60 in a direction towards the diaphragm 30, such that the two external press pillars 62 of the external sliding base 60 separately press against the stop section 31 of the two diaphragms 30 for sealing the third blind hole 24 and fourth blind hole 25 of the body 10. The second blind hole 23 and fifth blind hole 26 of the body 10 are not pressed to define an open status as shown in FIGS. 4 to 6. Air enters from the second channel 28 and passes through the fifth blind hole 26 to the interior of the diaphragm 30, and further passes through the second penetrating hole 22, so that the second penetrating hole 22 can penetrate the high-pressure air through an inlet on a side of the cylinder, and another inlet at another end of the cylinder is in the status of discharging air. In other words, the first penetrating hole 21 of the body 10 is in the status of discharging air, and the air is discharged from the first penetrating hole 21 of the body 10 and passed through the corresponding position of the diaphragm 30 along the second blind hole 23 and discharged from the first channel 27, so as to achieve the effects of receiving air from an end and discharging air from another end of the cylinder.

If the cylinder completes the first stage of receiving and discharging air, it is necessary to switch the directions of the cylinder for receiving and discharging air as shown in FIGS. 6. 8 and 9, and the solenoid valve 80 will control the fourth channel 18 and the fifth channel 19 to be remained in an interconnected status. Since the second channel 28 is in the status of receiving air at that time, some of the high-pressure air will pass through the fourth channel 18 interconnected to the fifth channel 19, and the foregoing valve switches the positions of the internal sliding base 50 and the external sliding base 60 to move, so that the third blind hole 24 and fourth blind hole 25 of the body 10 are in the open status, and the internal sliding base 50 is moved towards the fixing plate 40 to press the two diaphragms 30, and the stop sections 31 corresponding to the two diaphragms 30 seal the second blind hole 23 and fifth blind hole 26 of the body 10 to switch the direction of receiving air from the first penetrating hole 21 and the second penetrating hole 22. After the valve positions are switched as shown in FIGS. 4 to 6, the third blind hole 24 and fourth blind hole 25 of the body 10 are in an open status, and the second blind hole 23 and fifth blind hole 26 of the body 10 are in a closed status. If the second penetrating hole 22 of the body 10 is used for discharging air and the first penetrating hole 21 is used for receiving air, the second channel 28 receives air that passes through the corresponding diaphragm 30 and through the third blind hole 24 interconnected to the first penetrating hole 21, so that the first penetrating hole 21 is in the status of receiving air, and the second penetrating hole 22 connected to the inlet of the cylinder is in the status of discharging air. Therefore, the air will flow from the second penetrating hole 22 along the corresponding position of the diaphragm 30 to the fourth blind hole 25 and will be discharged from the third channel 29 to have a complete course of receiving and discharging air.

What is claimed is:

1. A valve comprising:
   a body, having two main surfaces including a first surface and a second surface, and a third surface and a fourth surface being disposed on a corresponding surface at the peripheries of the first surface and the second surface, and a fifth surface being disposed between the third surface and the fourth surface, and the body further comprises a first blind hole disposed at the middle of the first surface, and the first blind hole includes a generally rectangular first positioning groove and a generally rectangular second positioning groove disposed separately on both sides of the first blind hole, and two positioning grooves are parallel to the third surface, and the two fixing grooves separately include a first penetrating hole and a second penetrating hole disposed on the same horizontal line of the first blind hole, and the first positioning groove includes a second blind hole and a third blind hole disposed separately on both sides of the first positioning groove, and the second positioning groove includes a fourth blind hole and a fifth blind hole disposed separately on both sides of the second positioning groove, and the second blind hole and the fifth blind hole are disposed at an opposite end, and the distance from the second blind hole and the fifth blind hole to the first blind hole is smaller than the distance from the third blind hole and the fourth blind hole to the first blind hole, and the third surface includes a first channel interconnected to the second blind hole and a second channel interconnected to the third blind hole and the fifth blind hole, and the fourth surface includes a third channel interconnected to the fourth blind hole, and the fifth surface includes a fourth channel interconnected to the second channel and a fifth channel interconnected to the first blind hole;
   two generally rectangular diaphragms, embedded separately into the first positioning groove and the second positioning groove of the body, for selectively opening and closing the second, third, fourth, and fifth blind holes;
   an internal sliding base, disposed on a side of the body other than the side having a fixing plate, and the internal sliding base comprises a sliding section and an internal press pillar disposed separately on two corresponding ends of the bottom of the sliding section, and the two internal press pillars are capable of selectively opening and closing the two diaphragms corresponding to the second blind hole and the fifth blind hole of the body, and the internal sliding base includes a central axle passing through a through hole of the fixing plate and the first blind hole of the body in sequence;
   an external sliding base, coupled to the external periphery of the external sliding base, and the external sliding base includes a concave grove for coupling the internal sliding base, and the external sliding base further comprises an external press pillar disposed separately on both corresponding ends of the concave groove, and the external press pillar corresponds to the through hole of the fixing plate, and its ends are embedded into the two diaphragms at the corresponding positions of the third blind hole and the fourth blind hole of the body; and
   a casing, for covering the external periphery of the external sliding base and being secured with the body, and at least one elastic member being installed between an internal top surface of the casing and the external sliding base.

2. The valve of claim 1, wherein the two diaphragms comprises a stop section separately disposed on both ends of the diaphragm for selectively opening and closing the second, third, fourth, and fifth blind holes, and the ends of the two internal press pillars and the two external press pillar of the internal sliding base and external sliding base are embedded into the corresponding stop sections.

3. The valve of claims 1 or 2, wherein the internal sliding base and the body includes the fixing plate disposed between the internal sliding base and the body for fixing the two diaphragms in a position, and the through hole disposed separately at the corresponding first, second, third, fourth, and fifth blind holes for receiving the two internal press pillars and the central axle of the internal sliding base and the two external press pillars of the external sliding base.

4. The valve of claim 1, wherein the sliding section includes a shoulder section disposed at the bottom of the sliding section and two press pillars disposed separated at two corresponding ends of the shoulder section.

5. The valve of claim 1, wherein the internal sliding base includes an O-ring embedded at an end of the central axle.

6. The valve of claim 1, wherein the external sliding base includes a containing groove disposed at an end other than the end having the two external press pillars for installing at least one elastic member between the internal top surface of the casing and the containing groove of the external sliding base.

* * * * *